US012693614B2

(12) United States Patent
Abe

(10) Patent No.: US 12,693,614 B2
(45) Date of Patent: Jul. 28, 2026

(54) DEVELOPING CARTRIDGE INCLUDING SHAFT AND CAM POSITIONED ON OPPOSITE SIDE OF CASING FROM DEVELOPING ROLLER AND MOVABLE IN AXIAL DIRECTION OF DEVELOPING ROLLER

(71) Applicant: BROTHER KOGYO KABUSHIKI KAISHA, Nagoya (JP)

(72) Inventor: Koji Abe, Okazaki (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/983,693

(22) Filed: Dec. 17, 2024

(65) Prior Publication Data

US 2025/0116954 A1 Apr. 10, 2025

Related U.S. Application Data

(63) Continuation of application No. PCT/JP2023/022732, filed on Jun. 20, 2023.

(30) Foreign Application Priority Data

Jun. 29, 2022 (JP) ................................ 2022-104412

(51) Int. Cl.
*G03G 15/08* (2006.01)
*G03G 21/16* (2006.01)
*G03G 21/18* (2006.01)

(52) U.S. Cl.
CPC ..... *G03G 15/0896* (2013.01); *G03G 21/1676* (2013.01); *G03G 21/1821* (2013.01); *G03G 2221/163* (2013.01)

(58) Field of Classification Search
CPC ........... G03G 15/0896; G03G 21/1642; G03G 21/1671; G03G 21/1676; G03G 21/1814;
(Continued)

(56) References Cited

U.S. PATENT DOCUMENTS 11,150,600 B2 * 10/2021 Ichiyanagi ......... G03G 21/1633
2015/0003868 A1 1/2015 Shimizu et al.
(Continued)

FOREIGN PATENT DOCUMENTS

JP 2015-011231 A 1/2015
JP 2017-116826 A 6/2017
(Continued)

OTHER PUBLICATIONS

International Search Report issued in corresponding application PCT /JP2023/022732, Jul. 25, 2023.

*Primary Examiner* — Robert B Beatty
(74) *Attorney, Agent, or Firm* — Merchant & Gould P.C.

(57) ABSTRACT

A developing cartridge includes a casing, a developing roller, a shaft, and a first cam. The developing roller is rotatable about an axis extending in a first direction. A part of a peripheral surface of the developing roller is exposed on one side in a second direction. The developing roller is positioned at one end portion of the casing in a third direction crossing both the first direction and the second direction. The shaft extends in the first direction and is movable in the first direction relative to both the casing and the developing roller. The first cam is positioned at one end portion of the shaft in the first direction and is movable in the first direction together with the shaft. The shaft and the first cam are positioned at an other end portion of the casing in the third direction.

18 Claims, 12 Drawing Sheets

(58) Field of Classification Search
CPC ........... G03G 21/1821; G03G 21/1842; G03G 21/1864; G03G 2221/1606; G03G 2221/163
USPC .................................................. 399/119, 228
See application file for complete search history.

(56) References Cited

U.S. PATENT DOCUMENTS

| | | | | |
|---|---|---|---|---|
| 2017/0184998 | A1 | 6/2017 | Itabashi | |
| 2019/0302682 | A1 | 10/2019 | Wang et al. | |
| 2020/0103821 | A1 | 4/2020 | Wang et al. | |
| 2020/0301350 | A1* | 9/2020 | Sakaguchi | G03G 21/1638 |
| 2021/0356882 | A1* | 11/2021 | Iwasa | G03G 21/1821 |
| 2022/0214631 | A1* | 7/2022 | Ao | G03G 21/1864 |
| 2023/0315001 | A1* | 10/2023 | Wang | G03G 21/1821 399/111 |
| 2024/0176282 | A1* | 5/2024 | Abe | G03G 21/1676 |
| 2024/0280935 | A1* | 8/2024 | Abe | G03G 21/1821 |
| 2024/0402630 | A1* | 12/2024 | Abe | G03G 15/0812 |

FOREIGN PATENT DOCUMENTS

| | | | |
|---|---|---|---|
| JP | 2019-179128 | A | 10/2019 |
| JP | 2020-56818 | A | 4/2020 |

* cited by examiner

DEVELOPING CARTRIDGE INCLUDING SHAFT AND CAM POSITIONED ON OPPOSITE SIDE OF CASING FROM DEVELOPING ROLLER AND MOVABLE IN AXIAL DIRECTION OF DEVELOPING ROLLER

REFERENCE TO RELATED APPLICATIONS

This application is a continuation application of International Application No. PCT/JP2023/022732 filed on Jun. 20, 2023, which claims priority from Japanese Patent Application No. 2022-104412 filed on Jun. 29, 2022. The entire contents of the aforementioned applications are incorporated herein by reference.

BACKGROUND ART

Conventionally, there has been known an electrophotographic type image-forming apparatus such as a laser printer and an LED printer. Such a conventional image-forming apparatus is described in, for example, Patent literature 1.

The image-forming apparatus described in Patent literature 1 includes a developing cartridge and a drum cartridge. The developing cartridge includes a developing roller. The drum cartridge includes a photosensitive drum. The developing roller contacts the photosensitive drum upon attachment of the developing cartridge to the drum cartridge.

The image-forming apparatus described in Patent literature 1 further includes a separation member. The separation member is movable relative to a casing of the developing cartridge. Once the separation member is moved in a state where the developing cartridge is attached to the drum cartridge, the separation member contacts a frame of the drum cartridge. Hence, the developing cartridge is moved relative to the drum cartridge. As a result, the developing roller can be separated from the photosensitive drum.

SUMMARY

However, in the developing cartridge according to Patent literature 1, the separation member is positioned, among outer surfaces of the casing of the developing cartridge, on a surface that is on the same side as the developing roller (the outer surface of a lid 10B in Patent literature). In this structure, it is hard to arrange the separation member in line with a center of gravity of the developing cartridge in a separating direction. Accordingly, a larger load is likely to be imparted on the separation member in order to move the developing cartridge in the separating direction.

In view of the foregoing, it is an object of the present disclosure to provide a developing cartridge capable of reducing a load that is to be imparted on the separation member during a separating operation.

In order to solve the above-described problem, according to one aspect, the disclosure provides a developing cartridge including: a casing configured store developing agent therein; a developing roller rotatable about a first axis extending in a first direction; a shaft extending along a second axis extending in the first direction; and a first cam positioned at one end portion of the shaft in the first direction. A part of a peripheral surface of the developing roller on one side in a second direction is exposed to an outside of the casing and another part of the peripheral surface of the developing roller on an other side in the second direction is positioned inside the casing. The developing roller is positioned at one end portion of the casing in a third direction crossing the first direction and the second direction. The shaft is movable in the first direction relative to the casing and the developing roller. The first cam is movable in the first direction together with the shaft. The first cam has a first inclined surface that is inclined to approach the developing roller in the second direction as extending toward the one end portion of the shaft from an other end portion of the shaft in the first direction. The shaft and the first cam are positioned at an other end portion of the casing in the third direction.

According to the one aspect of the present disclosure, the shaft and the first cam are positioned opposite the developing roller in the third direction. With this structure, the shaft can be arranged closer to a position aligned with the center of gravity of the developing cartridge in the second direction. Accordingly, a load to be imparted on the shaft for moving the developing cartridge in the second direction can be reduced.

DESCRIPTION

Hereinafter, one embodiment of the present disclosure will be described while referring to the accompanying drawings.

Incidentally, in the following description, a direction in which a first axis of a developing roller 30 extends will be referred to as "first direction". Further, a direction in which, of a peripheral surface of the developing roller 30, a part exposed to an outside from a casing 10 and a part positioned inside the casing 10 are aligned with each other will be referred to as "second direction". Further, a direction crossing the first direction and the second direction will be referred to as "third direction". Finally, a direction orthogonal to both the first and third directions is referred to as "fourth direction".

The first direction and the second direction cross each other (preferably, perpendicular to each other). The second direction and the third direction cross each other. The third direction and the first direction cross each other (preferably, perpendicular to each other).

1. Structure of Image-Forming Apparatus

Figure 1:
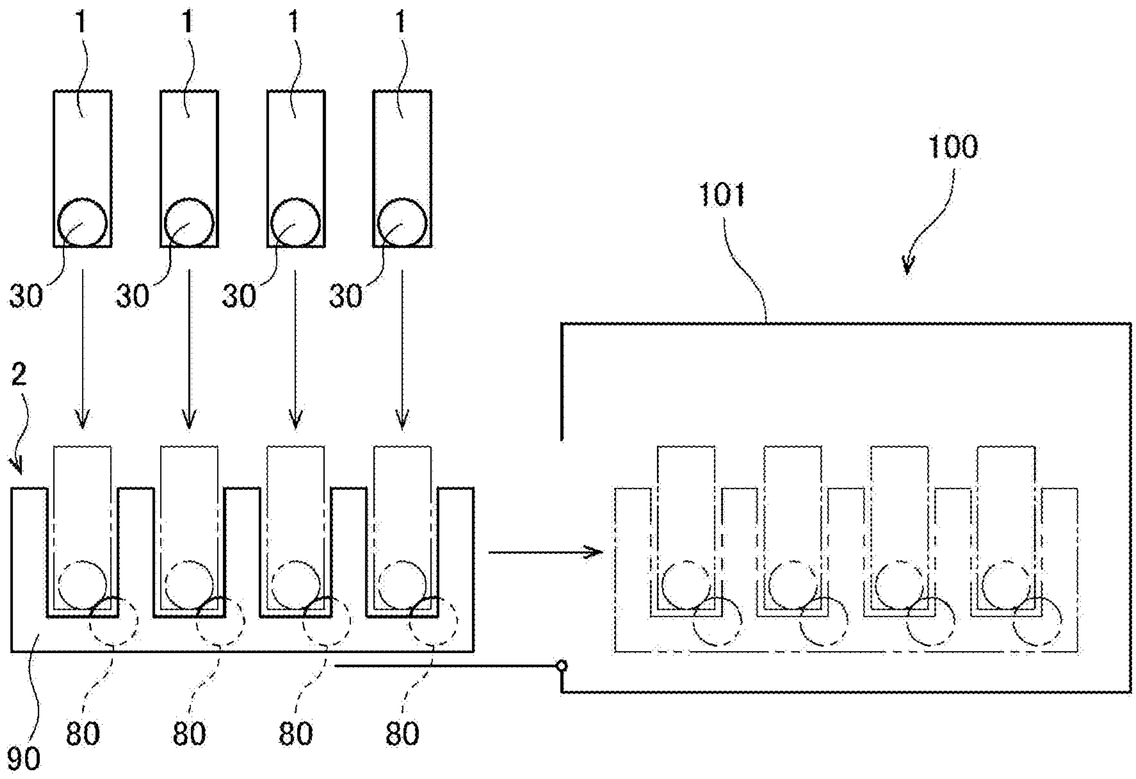
FIG. 1 is a schematic diagram of an image-forming apparatus.

FIG. 1 is a schematic view of an image-forming apparatus 100. The image-forming apparatus 100 is an electrophotographic type printer. Specifically, the image-forming apparatus 100 is a laser printer or an LED printer. As illustrated in FIG. 1, the image-forming apparatus 100 includes a main housing 101, a drum cartridge 2, and four developing cartridges 1.

The four developing cartridges 1 are attachable to and detachable from the drum cartridge 2. Further, the drum cartridge 2 to which the four developing cartridges 1 are attached is attachable to and detachable from the main housing 101.

The four developing cartridges 1 accommodate therein developing agents of four different colors (for example, yellow, magenta, cyan, and black). The developing agent is toner, for example. The image-forming apparatus 100 is configured to form an image on a surface of a printing sheet with the developing agents supplied from the developing cartridges 1.

2. Structure of Developing Cartridge

Figure 2:
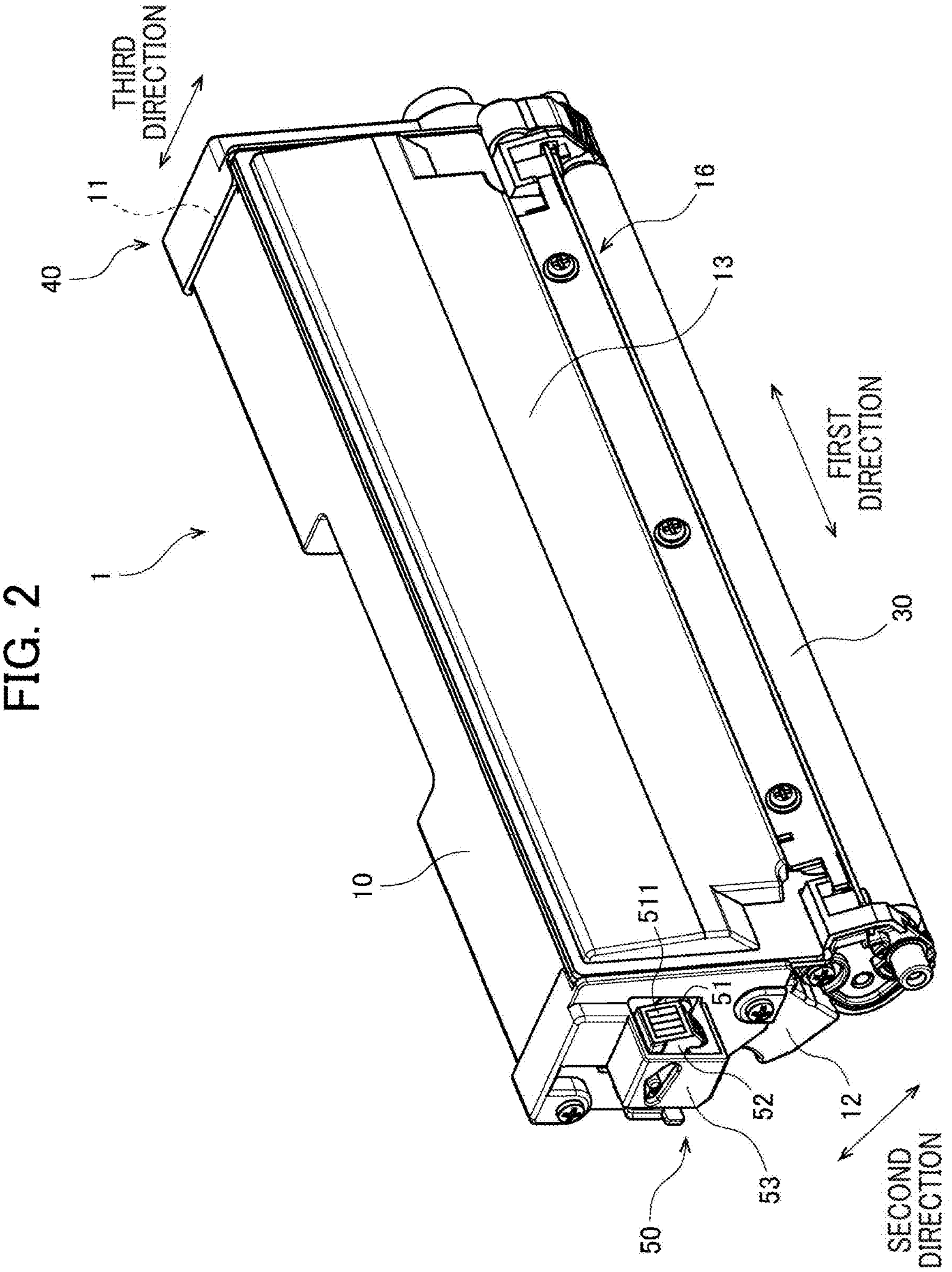
FIG. 2 is a perspective view of a developing cartridge.
Figure 3:
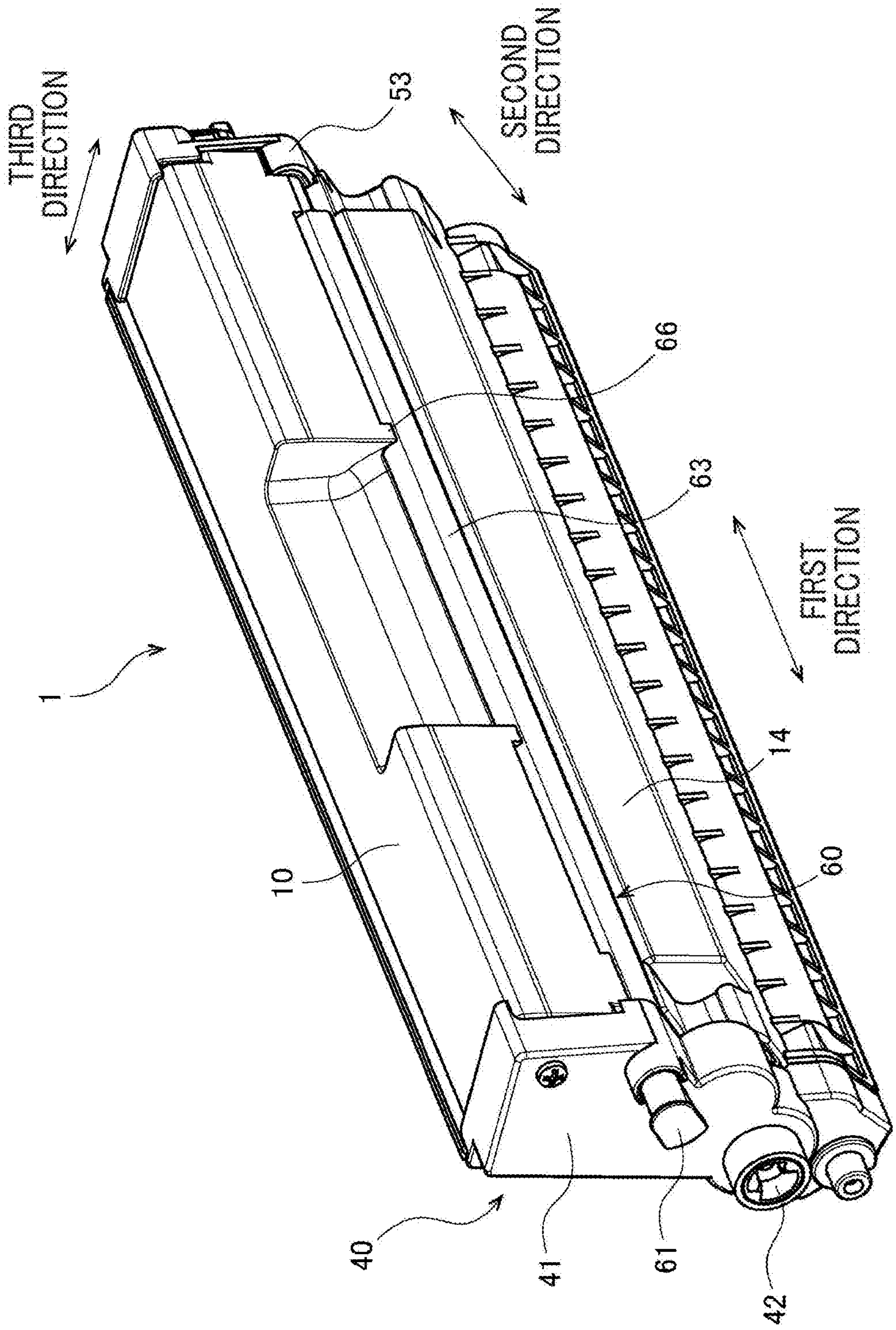
FIG. 3 is another perspective view of the developing cartridge.
Figure 4:
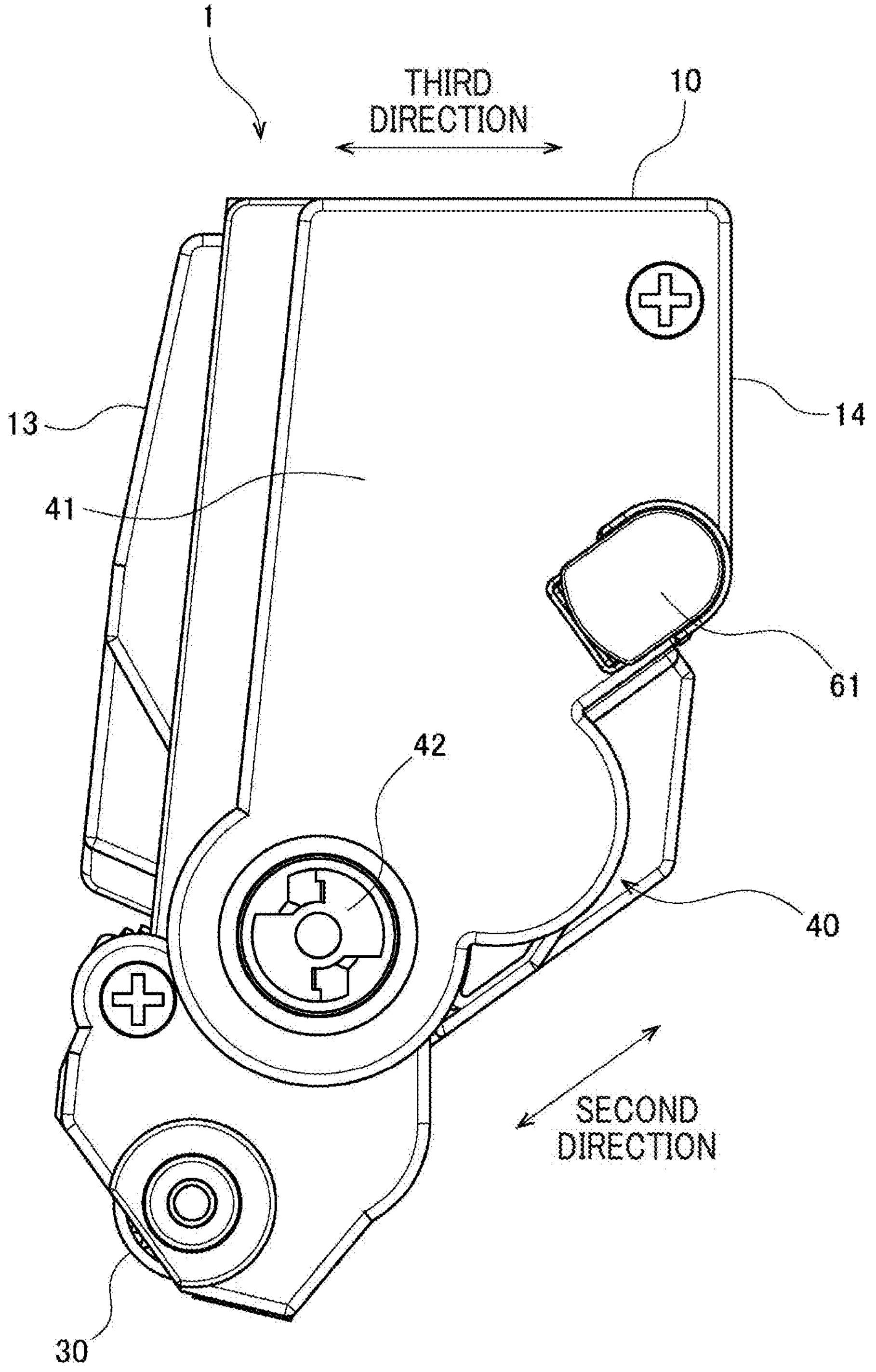
FIG. 4 is a view of the developing cartridge as viewed in a first direction.
Figure 5:
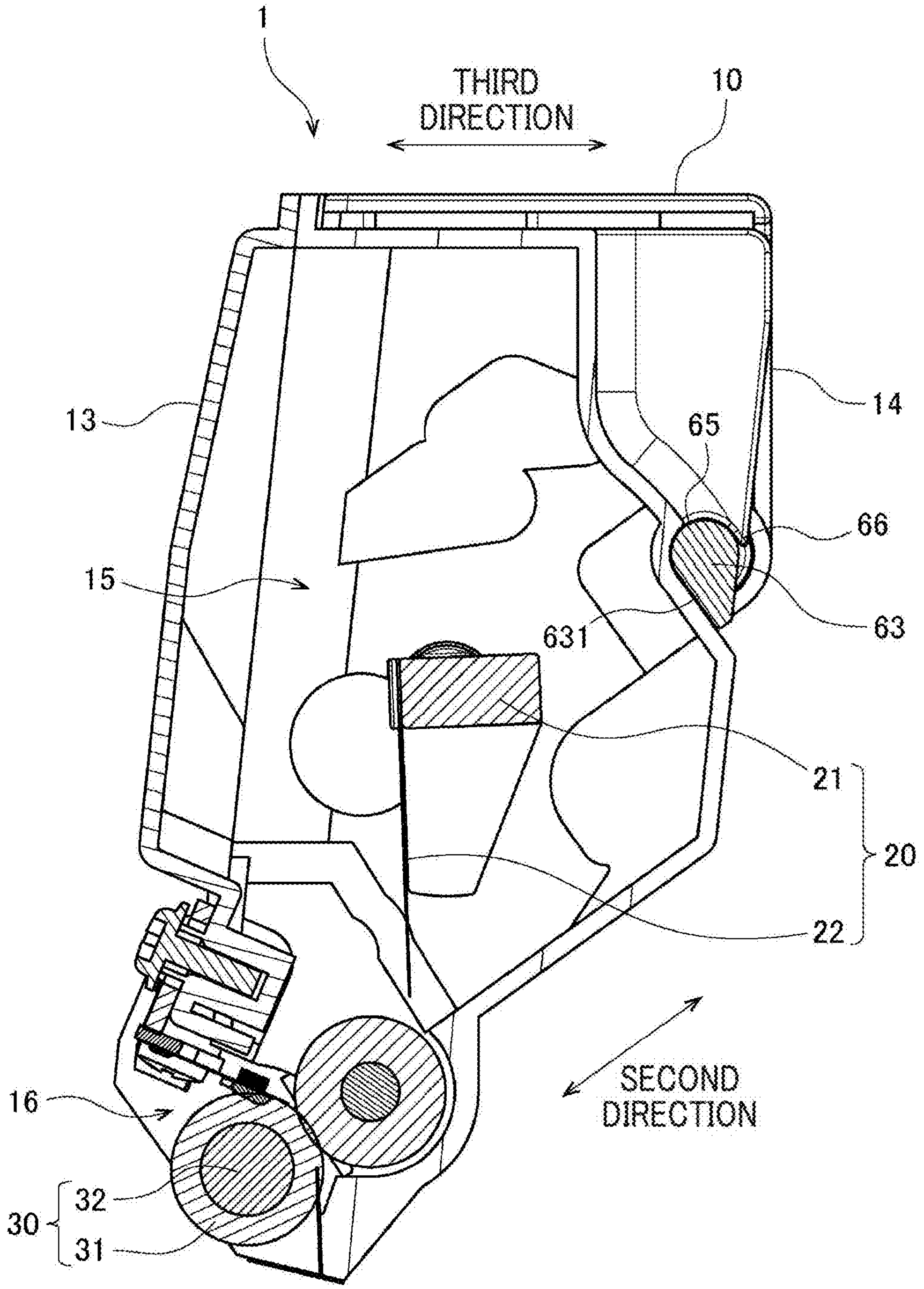
FIG. 5 is a vertical cross-sectional view of the developing cartridge taken along a plane perpendicular to the first direction.
Figure 6:
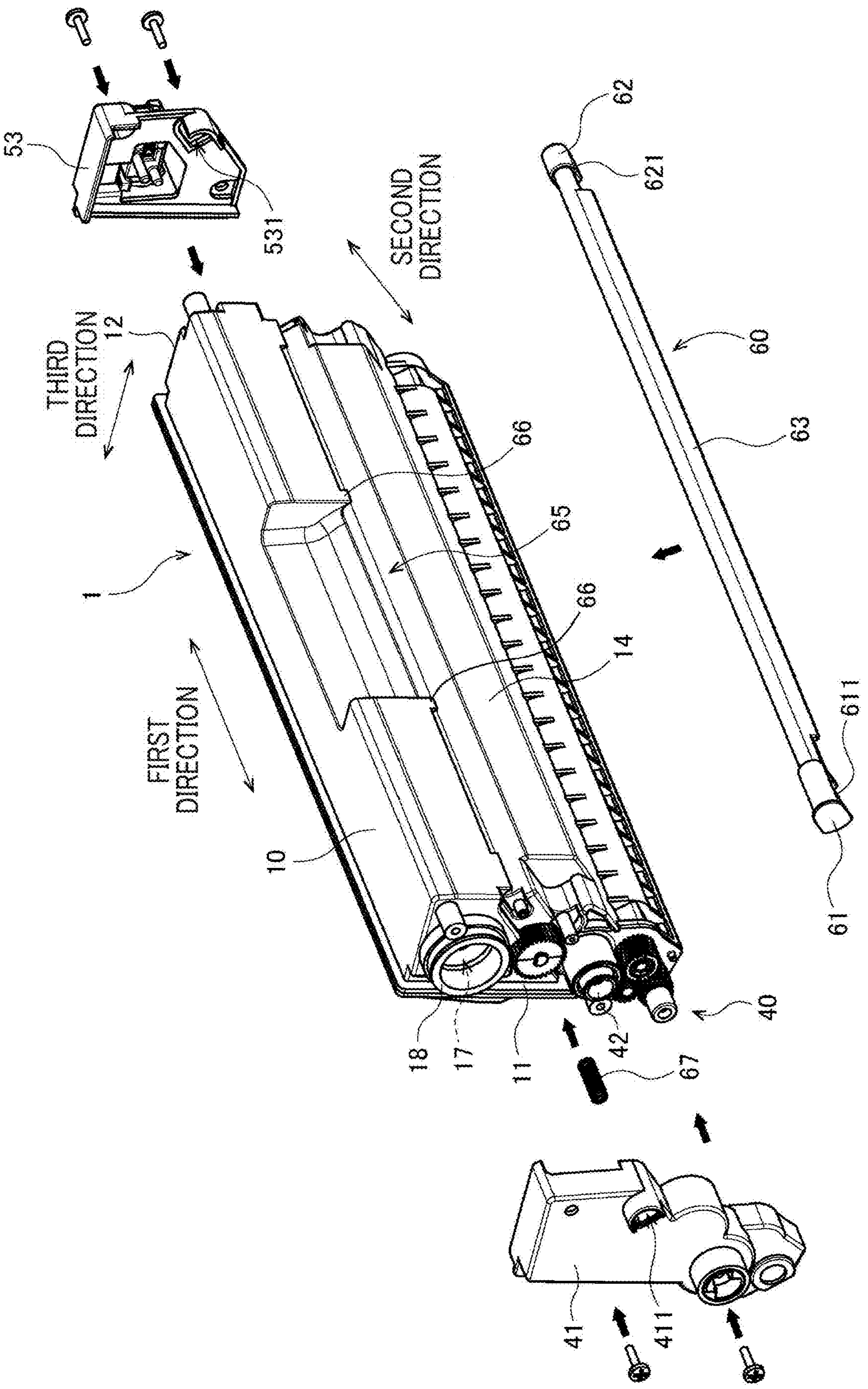
FIG. 6 is an exploded perspective view of the developing cartridge.

Subsequently, a structure of the developing cartridge 1 will be described. Incidentally, the four developing cartridges 1 have the same structure as one another. Hence, in the following description, only one of the four developing cartridges 1 will be described. FIGS. 2 and 3 are perspective views of the developing cartridge 1. FIG. 4 is a view of the developing cartridge 1 as viewed in the first direction. FIG. 5 is a vertical cross-sectional view of the developing cartridge 1 taken along a plane perpendicular to the first direction. FIG. 6 is an exploded perspective view of the developing cartridge 1.

As illustrated in FIGS. 2 through 6, the developing cartridge 1 includes the casing 10, an agitator 20, the developing roller 30, a gear part 40, a memory assembly 50, and a separation member 60.

The casing 10 is a container that can store the developing agent therein. The casing 10 has a first end surface 11 and a second end surface 12. The first end surface 11 is at one end portion of the casing 10 in the first direction. The second end surface 12 is at another end portion of the casing 10 in the first direction. The first end surface 11 and the second end surface 12 are positioned apart from each other in the first direction.

Further, the casing 10 has a first outer surface 13 and a second outer surface 14. The first outer surface 13 is at one end portion of the casing 10 in the third direction. The second outer surface 14 is at another end portion of the casing 10 in the third direction. The first outer surface 13 and the second outer surface 14 are positioned apart from each other in the third direction. A distance in the third direction between the first outer surface 13 and the second outer surface 14 is shorter than a distance in the first direction between the first end surface 11 and the second end surface 12. The first outer surface 13 is positioned on the same side as the developing roller 30 descried later in the third direction. The second outer surface 14 is positioned on the same side as the separation member 60 described later in the third direction. The dimension of the casing in the third direction is smaller than the dimension of the casing in the fourth direction as seen in FIG. 4.

As illustrated in FIG. 5, a storage chamber 15 is provided in an interior of the casing 10. The developing agent is stored in the storage chamber 15. Further, the casing 10 has an opening 16. The opening 16 is positioned at one end portion of the casing 10 in the second direction. The storage chamber 15 communicates with an exterior of the casing 10 through the opening 16.

Further, as illustrated in FIG. 6, the casing 10 includes a toner filling port 17 and a cap 18. The toner filling port 17 is positioned at the first end surface 11 of the casing 10. The cap 18 is attachable to the toner filling port 17 to close the toner filling port 17. The cap 18 is to be detached from the first end surface 11 for filling developing agent into the casing 10, and the developing agent is filled in the storage chamber 15 through the toner filling port 17.

The agitator 20 includes an agitator shaft 21 and a film 22. The agitator shaft 21 extends in the first direction. The film 22 extends from the agitator shaft 21 toward an inner surface of the casing 10. That is, the film 22 extends radially outwardly from the agitator shaft 21. A portion of the agitator shaft 21 and the film 22 are positioned inside the storage chamber 15 of the casing 10.

An agitator gear, which is included in the gear part 40, is attached to one end portion of the agitator shaft 21 in the first direction. Specifically, the agitator gear included in the gear part 40 is fixed to the one end portion of the agitator shaft 21 in the first direction. As the agitator gear rotates, the agitator shaft 21 and the film 22 are caused to rotate about an axis (third axis) extending in the first direction. By the rotation of the film 22, the developing agent in the storage chamber 15 is agitated.

The developing roller 30 is a roller rotatable about an axis (first axis) extending in the first direction. The developing roller 30 is positioned at the opening 16 of the casing 10. That is, the developing roller 30 is positioned at the one end portion of the casing 10 in the second direction. A part of the peripheral surface of the developing roller 30 on one side in the second direction is positioned outside of the casing 10. A part of the peripheral surface of the developing roller 30 on an other side in the second direction is positioned inside the casing 10.

Further, the developing roller 30 is positioned on the same side as the first outer surface 13 in the third direction. That is, the developing roller 30 is positioned at the one end portion of the casing 10 in the third direction.

As illustrated in FIG. 5, the developing roller 30 includes a developing-roller body 31 and a developing-roller shaft 32. The developing-roller body 31 is a hollow cylindrical member extending in the first direction. The developing-roller body 31 is made of, for example, rubber having elasticity. The developing-roller shaft 32 is a solid columnar member extending throughout the developing-roller body 31 in the first direction. The developing-roller body 31 is fixed relative to the developing-roller shaft 32. The developing-roller shaft 32 is made of metal or electrically conductive resin.

A developing roller gear, which is included in the gear part 40, is attached to one end portion of the developing-roller shaft 32 in the first direction. Specifically, the developing roller gear of the gear part 40 is fixed to the one end portion of the developing-roller shaft 32 in the first direction. As the developing roller gear rotates, the developing-roller shaft 32 and the developing-roller body 31 are caused to rotate about the axis (first axis) extending in the first direction. The developing agent stored in the casing 10 is carried on an outer peripheral surface of the developing-roller body 31.

The gear part 40 is positioned at the first end surface 11 of the casing 10. The gear part 40 includes a gear cover 41, a coupling 42, and a plurality of gears. The gear cover 41 is positioned at the one end portion of the casing 10 in the first direction. Specifically, the gear cover 41 is fixed to the first end surface 11 of the casing 10. The plurality of gears includes the above-described agitator gear and developing roller gear. At least a part of the plurality of gears is positioned between the first end surface 11 and the gear cover 41 in the first direction.

As illustrated in FIGS. 3 and 4, the coupling 42 is exposed to the outside from the gear cover 41. Upon attachment of the drum cartridge 2 to the image-forming apparatus 100 with the developing cartridges 1 attached to the drum cartridge 2, a drive shaft of the image-forming apparatus 100 is connected to the coupling 42. The rotation of the drive shaft is transmitted to the agitator 20 through the coupling 42 and the agitator gear. Further, the rotation of the drive shaft is transmitted to the developing roller 30 through the coupling 42 and the developing roller gear.

The memory assembly 50 is positioned at the second end surface 12 of the casing 10. The memory assembly 50 includes a memory 51 as a storage medium, and a holder 52 holding the memory 51. The memory 51 is an IC chip, for example. The memory 51 has electrical contact surfaces 511. The electrical contact surfaces 511 are made of metal as an electrically conductive body. Of the memory 51, at least the electrical contact surfaces 511 are held on an outer surface of the holder 52. The electrical contact surfaces 511 extend to cross relative to the third direction.

The memory 51 is configured to store various information about the developing cartridge 1. Specifically, the memory 51 is configured to store at least one of: a cumulative number of printed sheets using the developing roller 30; a cumulative number of rotations of the developing roller 30; and a cumulative consumption amount of the developing agent. Such information is information indicative of a service life of the developing cartridge 1. Further, the memory 51 may store information such as a production number of the developing cartridge 1, a matching model with which the developing cartridge 1 can be used, and the like.

As illustrated in FIGS. 3 through 5, the developing cartridge 1 includes a holder cover 53. The holder cover 53 is positioned at the other end portion of the casing 10 in the first direction. Specifically, the holder cover 53 is attached to the second end surface 12 of the casing 10. More specifically, the holder cover 53 is fixed to the second end surface 12 of the casing 10. The holder 52 is held by the holder cover 53. In the first direction, the holder 52 is positioned between the casing 10 and the holder cover 53.

Upon attachment of the drum cartridge 2 to the main housing 101 of the image-forming apparatus 100 with the developing cartridges 1 attached to the drum cartridge 2, the electrical contact surfaces 511 of the memory 51 contacts an electrical contact provided in the main housing 101. Hence, a controller of the image-forming apparatus 100 can read information from the memory 51 and write information into the memory 51.

In a state where the drum cartridge 2 having the developing cartridges 1 attached thereto is attached to the image-forming apparatus 100, the image-forming apparatus 100 can perform a separating operation with respect to each developing cartridge 1. The separating operation is an operation for moving the developing roller 30 from a contacting position where the developing roller 30 is in contact with a photosensitive drum 80 to a separated position where the developing roller 30 is separated away from the photosensitive drum 80. The image-forming apparatus 100 performs the separating operation to the developing cartridge 1 in a case where the developing cartridge 1 is not used. Hence, the developing roller 30 of the developing cartridge 1 that is not to be used is to be separated from the photosensitive drum 80.

The separation member 60 is configured to switch the developing roller 30 between the contacting position and the separated position. The separation member 60 is positioned at the other end portion of the casing 10 in the third direction. Specifically, the separation member 60 is positioned at the second outer surface 14 of the casing 10. That is, the separation member 60 is positioned opposite the developing roller 30 with respect to the agitator shaft 21 in the third direction. Further, the separation member 60 is positioned opposite the developing roller 30 with respect to the holder 52 in the third direction. Further, the separation member 60 is positioned opposite the developing roller 30 with respect to the toner filling port 17 in the third direction.

As illustrated in FIGS. 3 and 6, the separation member 60 includes a first cam 61, a second cam 62, and a shaft 63. The first cam 61, the second cam 62, and the shaft 63 are integrally molded with resin.

The shaft 63 extends linearly along an axis (second axis) extending in the first direction. The shaft 63 is positioned at the second outer surface 14 of the casing 10. Specifically, as illustrated in FIGS. 5 and 6, the second outer surface 14 of the casing 10 has a groove 65 extending in the first direction. The shaft 63 is positioned in the groove 65. With this structure, the shaft 63 is held such that the shaft 63 is movable in the first direction relative to the casing 10. Since the shaft 63 is positioned in the groove 65, displacement of the shaft 63 in a direction crossing the first direction can be restrained.

As illustrated in FIG. 5, an outer surface of the shaft 63 includes a flat contacting surface 631. The contacting surface 631 extends in a direction crossing a rotational direction about the second axis. The contacting surface 631 contacts a peripheral surface of the groove 65. This structure can restrain the shaft 63 from rotating about the second axis relative to the casing 10.

Further, as illustrated in FIGS. 5 and 6, the casing 10 includes a pair of ribs 66. Each rib 66 protrudes from the second outer surface 14 of the casing 10. Each rib 66 partially covers the groove 65. The shaft 63 is positioned between the groove 65 and each rib 66 in the second direction. In this way, since the shaft 63 is positioned between the second outer surface 14 and each rib 66, positional displacement of the shaft 63 in the direction crossing the first direction can be further restrained.

The first cam 61 is positioned at one end portion of the shaft 63 in the first direction. The first cam 61 is positioned at the first end surface 11 of the casing 10. The first cam 61 has a first inclined surface 611. The first inclined surface 611 is positioned on a part of a peripheral surface of the first cam 61, the peripheral surface being centered on the second axis of the shaft 63. The first inclined surface 611 is inclined relative to the first direction. Specifically, the first inclined surface 611 gradually separates from the shaft 63 in a radial direction thereof as extending toward the one end portion from an other end portion of the shaft 63 in the first direction. Further, the first inclined surface 611 gradually approaches the developing roller 30 in the second direction as extending toward the one end portion from the other end portion of the shaft 63 in the first direction.

The first cam 61 is held by the gear cover 41. Specifically, the gear cover 41 has a first through-hole 411. The first through-hole 411 penetrates the gear cover 41 in the first direction. A part of the first cam 61 is inserted in the first through-hole 411. Hence, the first cam 61 is held such that the first cam 61 is movable in the first direction relative to the gear cover 41. Further, the first cam 61 is restricted from rotating about the second axis relative to the gear cover 41. However, the first inclined surface 611 is not inserted in the first through-hole 411 but is exposed to the outside from the gear cover 41.

As illustrated in FIG. 4, the first cam 61 is positioned between the first outer surface 13 and the second outer surface 14 in the third direction. That is, the first cam 61 does not protrude out from the second outer surface 14 toward the other end portion of the casing 10 in the third direction. With this structure, an outer dimension of the developing cartridge 1 can be reduced.

The second cam 62 is positioned at the other end portion of the shaft 63 in the third direction. The second cam 62 is positioned at the second end surface 12 of the casing 10. The second cam 62 has a second inclined surface 621. The second inclined surface 621 is positioned on a part of the peripheral surface of the second cam 62, the peripheral surface being centered on the second axis of the shaft 63. The second inclined surface 621 is inclined relative to the first direction. Specifically, the second inclined surface 621 gradually separates from the shaft 63 in its radial direction as extending toward the one end portion from the other end portion of the shaft 63 in the first direction. Further, the second inclined surface 621 gradually approaches the developing roller 30 in the second direction as extending toward the one end portion from the other end portion of the shaft 63 in the first direction.

The second cam 61 is held by the holder cover 53. Specifically, the holder cover 53 has a second through-hole 531. The second through-hole 531 penetrates the holder cover 53 in the first direction. A part of the second cam 62 is inserted in the second through-hole 531. Hence, the second cam 62 is held such that the second cam 62 is movable in the first direction relative to the holder cover 53. Further, the second cam 62 is restricted from rotating about the second axis relative to the holder cover 53. However, the second inclined surface 621 is not inserted in the second through-hole 531 but is exposed to the outside from the holder cover 53.

Similar to the first cam 61, the second cam 62 is positioned between the first outer surface 13 and the second outer surface 14 in the third direction. That is, the second cam 62 does not protrude out from the second outer surface 14 toward the other end portion of the casing 10 in the third direction. Hence, the outer dimension of the developing cartridge 1 can be reduced.

The separation member 60 is movable, relative to the casing 10 and developing roller 30, between a first position and a second position in the first direction. The movement of the separation member 60 from the first position to the second position represents a movement in a direction from the first cam 61 toward the second cam 62.

Figure 7:
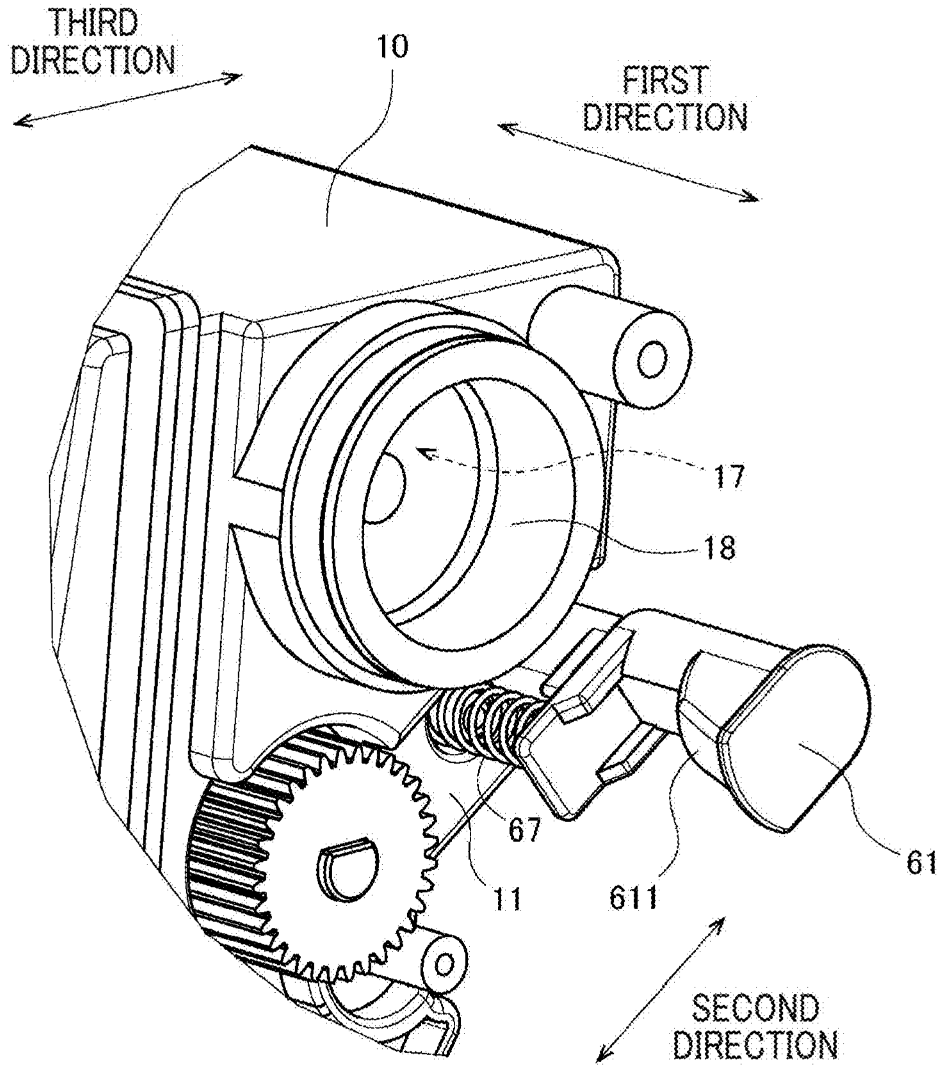
FIG. 7 is a partial perspective view of the developing cartridge.

FIG. 7 is a partial perspective view of the developing cartridge 1 from which the gear cover 41 is removed. As illustrated in FIGS. 6 and 7, the developing cartridge 1 includes a resilient member 67. The resilient member 67 is a spring capable of expanding and compressing in the first direction. The resilient member 67 is positioned at the first end surface 11 of the casing 10. The resilient member 67 is interposed between the casing 10 and the first cam 61 in the first direction. The resilient member 67 has one end portion in the first direction that is seated on the first cam 61, and an other end portion in the first direction that is seated on the first end surface 11 of the casing 10.

The resilient member 67 is compressed to have a length shorter than its natural length in the first direction. Hence, the resilient member 67 urges the separation member 60 in the first direction, from the second position toward the first position, relative to the casing 10. Accordingly, the separation member 60 is at the first position in a state where the separation member 60 is not depressed by a pressure shaft 102 described later.

Details of the separating operation using the separation member 60 will be described later.

3. Drum Cartridge

As illustrated in FIG. 1, the drum cartridge 2 includes four photosensitive drums 80 and a drum frame 90.

The four photosensitive drums 80 are supported by the drum frame 90. The four photosensitive drums 80 are positioned on one end portion of the drum frame 90 in the second direction. The four photosensitive drums 80 are arranged at intervals in the third direction. Each photosensitive drum 80 is rotatable about a drum axis extending in the first direction. Each photosensitive drum 80 has a cylindrical-shaped outer surface centered on the drum axis. An outer peripheral surface of each photosensitive drum 80 is covered with photosensitive material. Outer surfaces of the developing rollers 30 contact the outer surfaces of the photosensitive drums 80 upon attachment of the developing cartridges 1 to the drum cartridge 2.

The drum frame 90 is a frame configured to support the four developing cartridges 1. The four developing cartridges 1 are attachable to and detachable from the drum frame 90.

Figure 8:
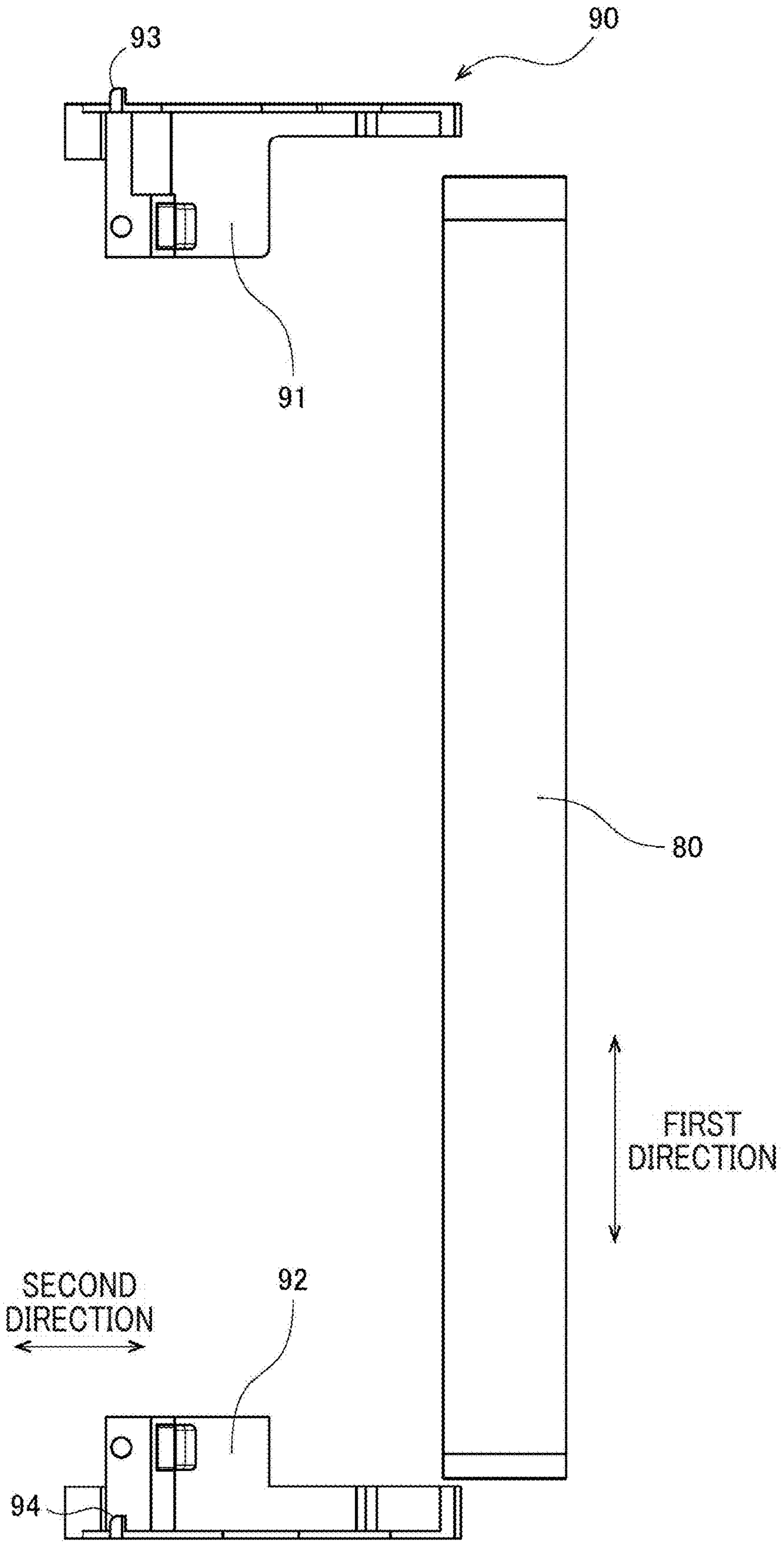
FIG. 8 is a partial plan view of a drum cartridge.

FIG. 8 is a partial plan view of the drum cartridge 2. As illustrated in FIG. 8, the drum frame 90 includes a first side frame 91 and a second side frame 92. The first side frame 91 is positioned at one end portion of the drum frame 90 in the first direction. The second side frame 92 is positioned at an other end portion of the drum frame 90 in the first direction. The first side frame 91 and the second side frame 92 are spaced apart from each other in the first direction.

The photosensitive drum 80 is positioned between the first side frame 91 and the second side frame 92 in the first direction. Further, in a state where the developing cartridge 1 is attached to the drum cartridge 2, the casing 10 of the developing cartridge 1 is positioned between the first side frame 91 and the second side frame 92 in the first direction.

The first side frame 91 includes first bearing parts 93. The first bearing parts 93 are positioned at the one end portion of the drum frame 90 in the first direction. Each first bearing part 93 is a part configured to contact the first cam 61 of the corresponding developing cartridge 1 in the separating operation. In the present embodiment, the first bearing part 93 is a protrusion formed on the first side frame 91. However, the first bearing part 93 may be a roller that is rotatable while being in contact with the first cam 61.

The second side frame 92 includes second bearing parts 94. The second bearing parts 94 are positioned at the other end portion of the drum frame 90 in the first direction. Each second side frame 92 is a part configured to contact the second cam 62 of the corresponding developing cartridge 1 in the separating operation. In the present embodiment, the second bearing part 94 is a protrusion formed on the second side frame 92. However, the second bearing part 94 may be a roller that is rotatable while being in contact with the second cam 62.

4. Separating Operation

Figure 9:
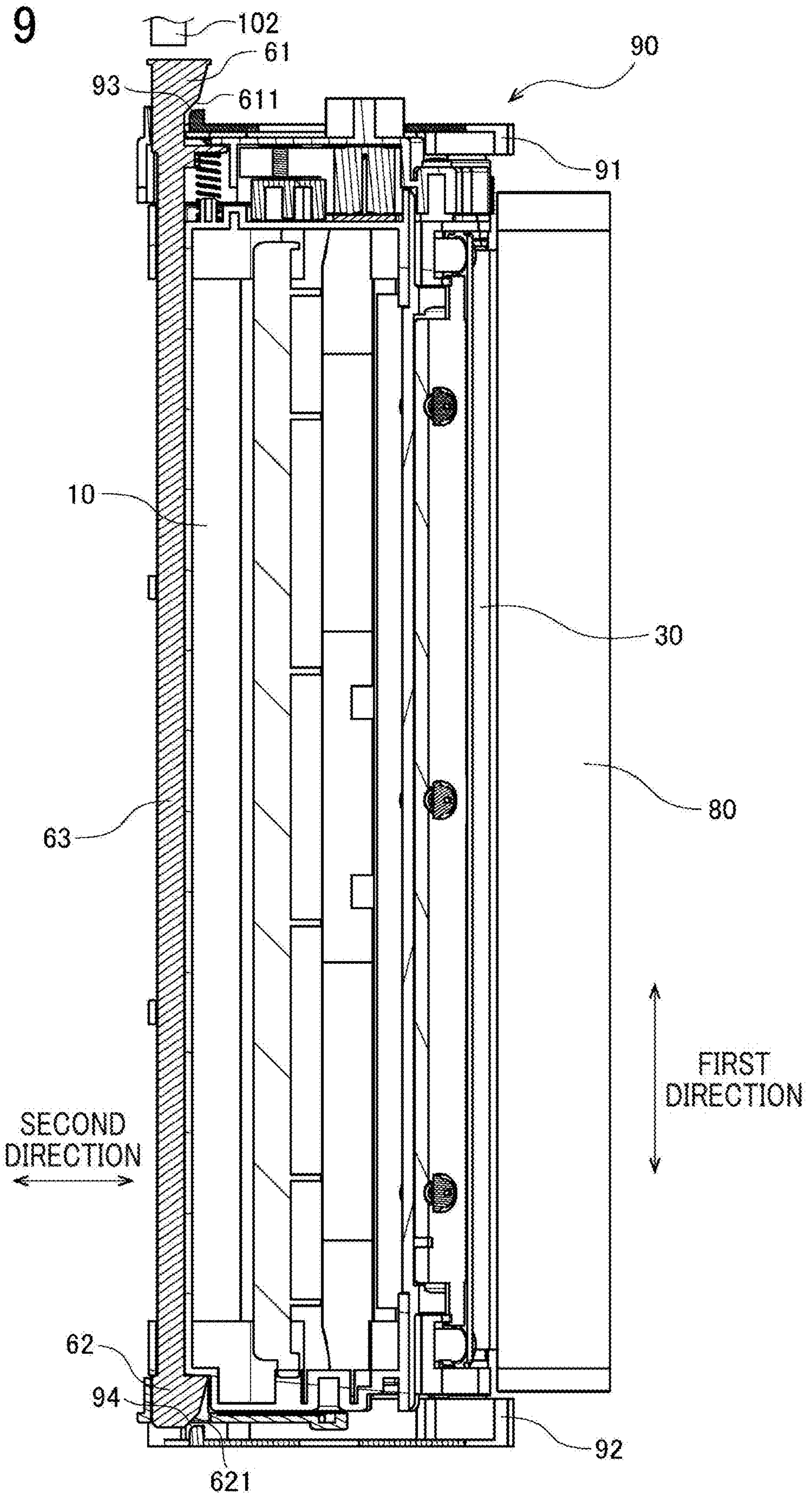
FIG. 9 is a transverse cross-sectional view of the drum cartridge and the developing cartridge in a state where a separating operation is not performed.
Figure 10:
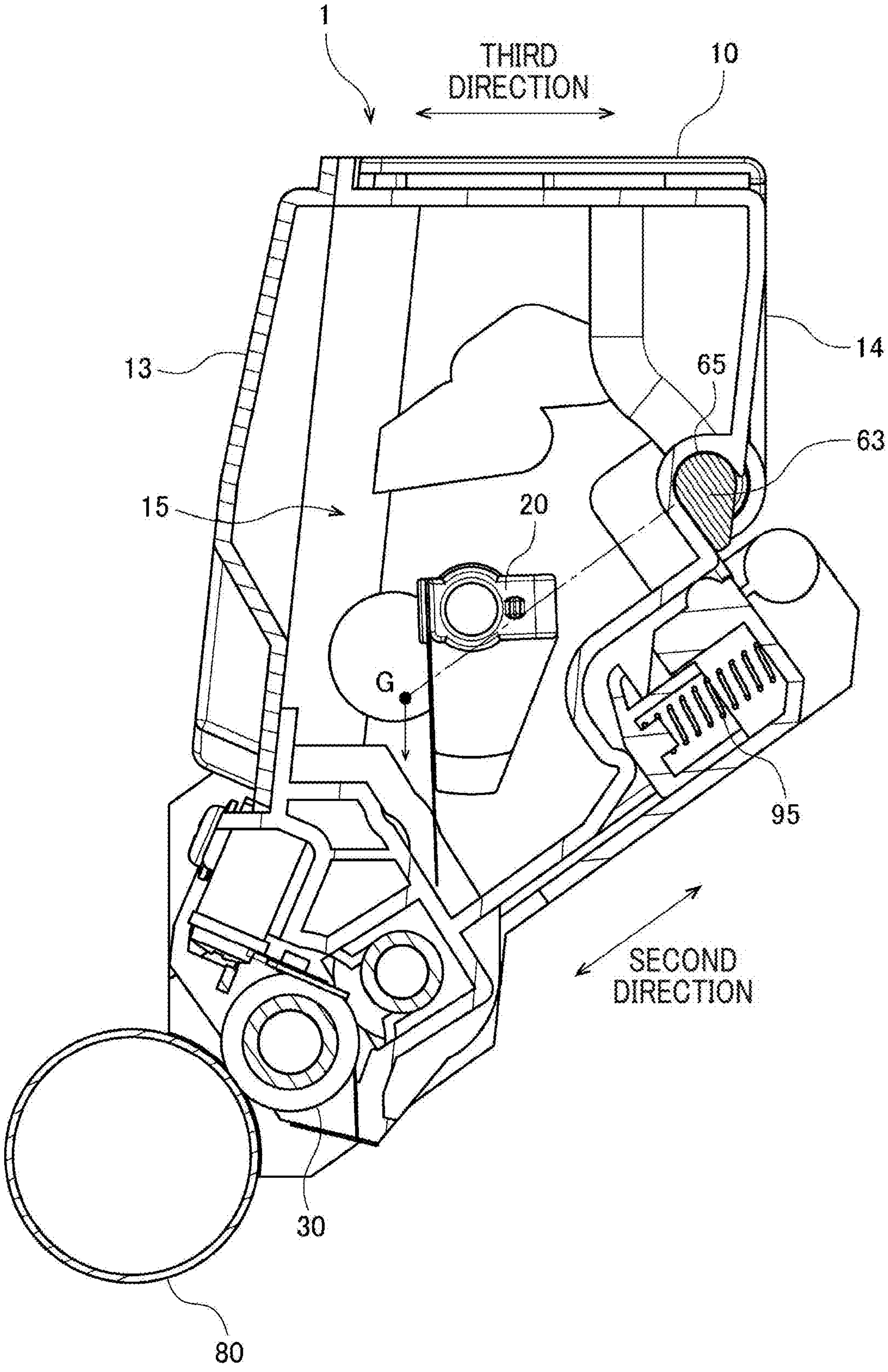
FIG. 10 is a vertical cross-sectional view of the drum cartridge and the developing cartridge in a state where a separating operation is not performed.
Figure 11:
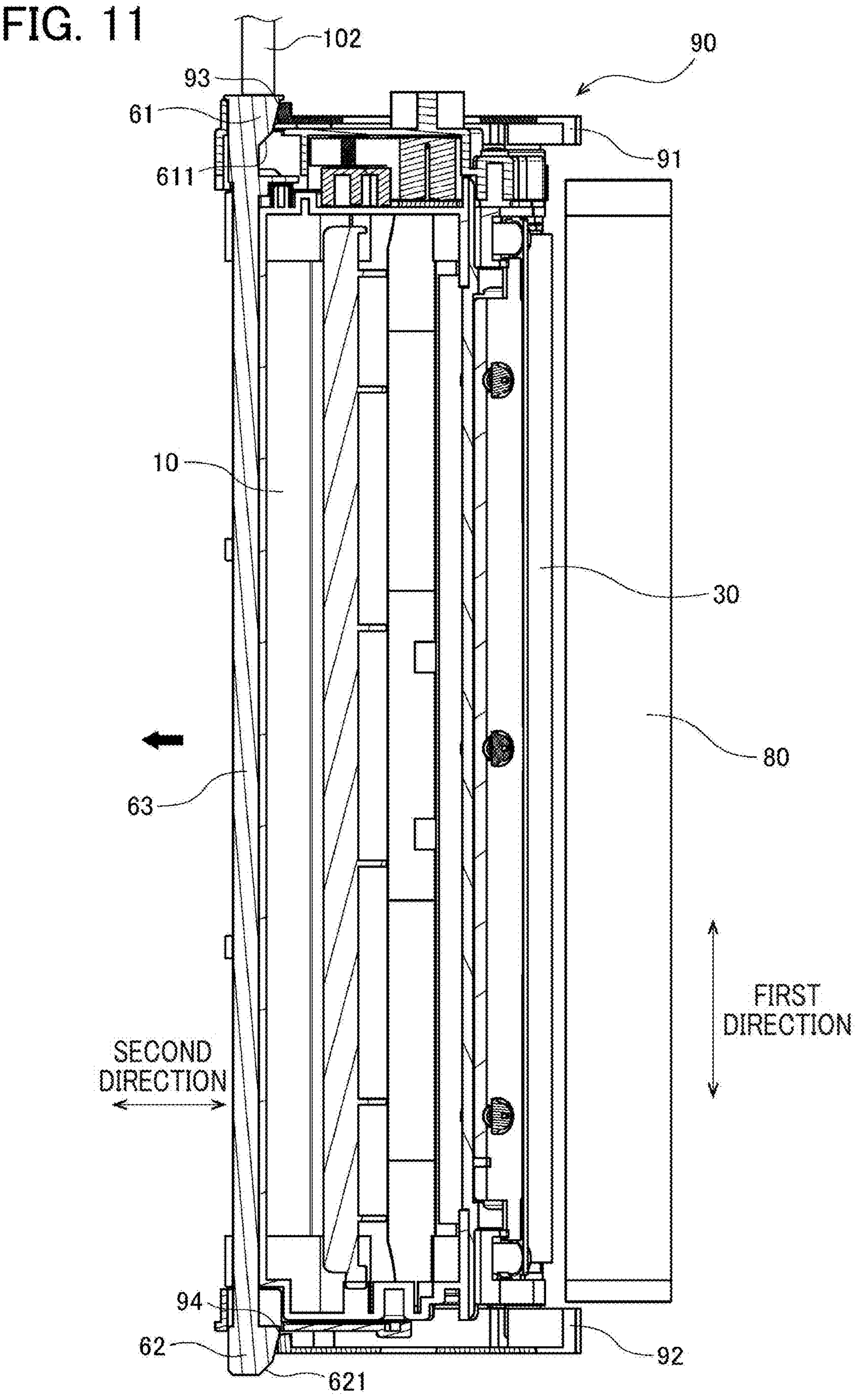
FIG. 11 is a transverse cross-sectional view of the drum cartridge and the developing cartridge in a state where a separating operation is performed.
Figure 12:
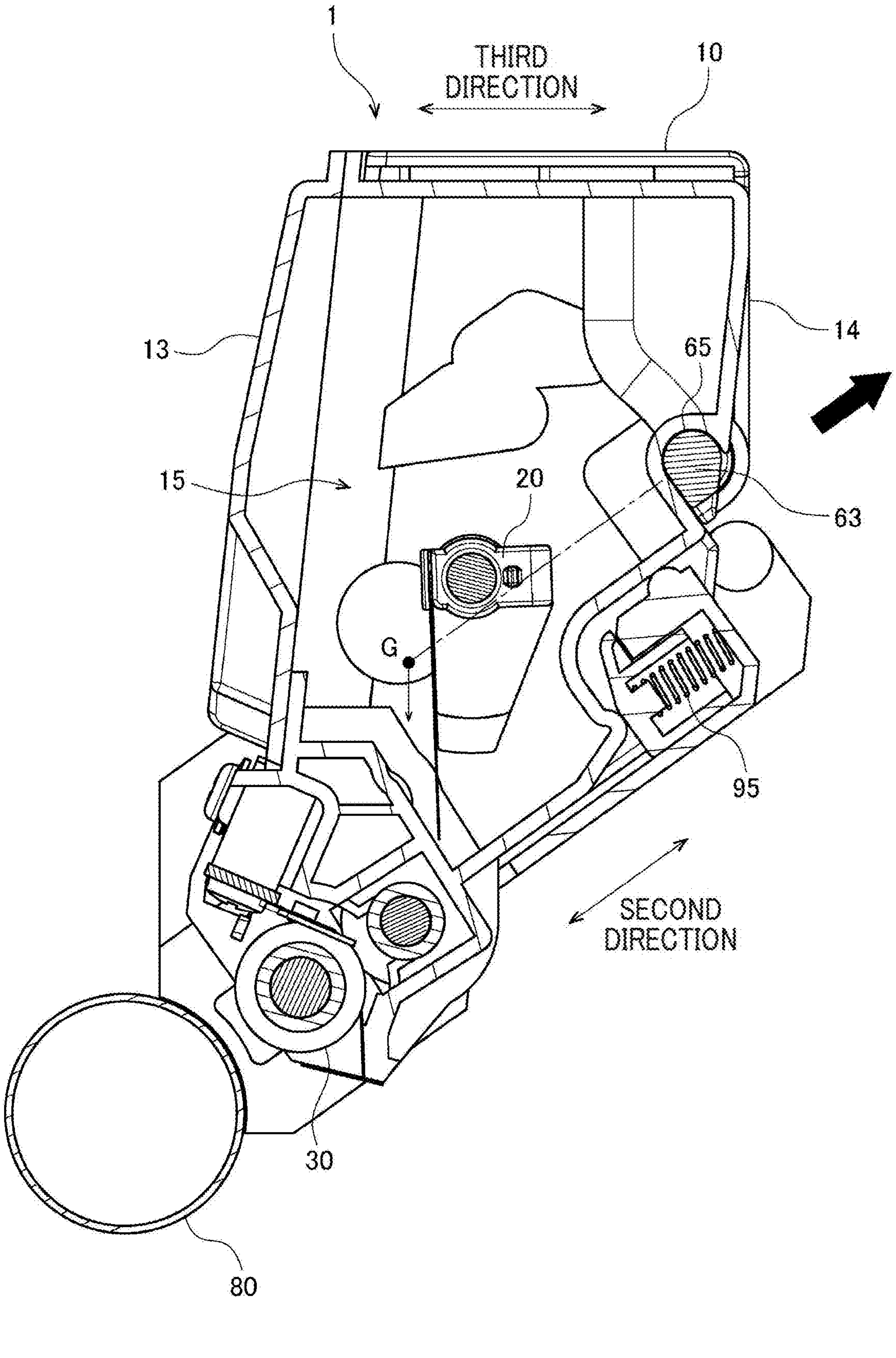
FIG. 12 is a vertical cross-sectional view of the drum cartridge and the developing cartridge in a state where a separating operation is performed.

Next, the separating operation performed in the image-forming apparatus 100 will be described. FIG. 9 is a transverse cross-sectional view of the drum cartridge 2 and the developing cartridge 1 while the separating operation is not performed. FIG. 10 is a vertical cross-sectional view of the drum cartridge 2 and the developing cartridge 1 while the separating operation is not performed. FIG. 11 is a transverse cross-sectional view of the drum cartridge 2 and the developing cartridge 1 while the separating operation is performed. FIG. 12 is a vertical cross-sectional view of the drum cartridge 2 and the developing cartridge 1 while the separating operation is performed.

As illustrated in FIGS. 10 and 12, the drum cartridge 2 includes pressure mechanisms 95. The developing roller 30 is pressed by the corresponding pressure mechanism 95 toward the photosensitive drum 80 upon attachment of the developing cartridge 1 to the drum cartridge 2. Hence, as illustrated in FIGS. 9 and 10, the outer surface of the developing roller 30 contacts the outer surface of the photosensitive drum 80. That is, the developing roller 30 is brought to the contacting position.

Further, as illustrated in FIGS. 9 and 11, the image-forming apparatus 100 includes the pressure shafts 102. Each pressure shaft 102 faces the first cam 61 of the corresponding developing cartridge 1 in the first direction in the state where the drum cartridge 2 having the four developing cartridges 1 attached thereto is attached to the main housing 101.

Each pressure shaft 102 is movable in the first direction between a retracted position (illustrated in FIG. 9) and a protruding position (illustrated in FIG. 11), the protruding position being closer to the developing cartridge 1 than the retracted position is to the developing cartridge 1. For performing the separating operation, the image-forming apparatus 100 is configured to move the pressure shaft 102 from the retracted position to the protruding position, which movement brings the pressure shaft 102 into contact with the first cam 61. Accordingly, the pressure shaft 102 pushes the separation member 60 in the direction toward the second cam 62 from the first cam 61 in the first direction. As a result, the resilient member 67 is compressed, thereby moving the separation member 60 in the first position relative to the casing 10 from the first position to the second position. That is, the separation member 60 moves in the first direction, relative to the drum frame 90, from the first position to the second position.

As the separation member 60 moves from the first position to the second position, the first inclined surface 611 of the first cam 61 moves in the first direction while being in contact with the first bearing part 93 of the drum cartridge 2. At this time, the first cam 61 moves in a direction away from the photosensitive drum 80, relative to the drum frame 90, by a reaction force applied from the first bearing part 93.

Similarly, as the separation member 60 moves from the first position to the second position, the second inclined surface 621 of the second cam 62 moves in the first direction while being in contact with the second bearing part 94 of the drum cartridge 2. At this time, the second cam 62 moves in the direction away from the photosensitive drum 80, relative to the drum frame 90, by a reaction force applied from the second bearing part 94.

Further, as the first cam 61 and the second cam 62 move in the direction away from the photosensitive drum 80, the shaft 63 pushes the ribs 66 of the casing 10 in the direction away from the photosensitive drum 80 in the second direction. As such, the casing 10 and the developing roller 30 move, together with the separation member 60, relative to the drum frame 90, in the direction away from the photosensitive drum 80 in the second direction. As a result, the developing roller 30 moves from the contacting position where the developing roller 30 contacts the photosensitive drum 80 to the separated position where the developing roller 30 is separated away from the photosensitive drum 80.

Particularly, in the present embodiment, the separation member 60 is not positioned at the first outer surface 13 of the casing 10 but is positioned at the second outer surface 14 of the casing 10. That is, the first cam 61, the second cam 62, and the shaft 63 are positioned opposite the developing roller 30 in the third direction. With this structure, compared to a structure where the separation member 60 is positioned at the first outer surface 13 of the casing 10, the shaft 63 can be arranged closer to a position which is in line with the position of the center of gravity G of the developing cartridge 1 in the second direction. Accordingly, a load to be imparted on the shaft 63 for moving the developing cartridge 1 in the second direction can be reduced. Consequently, a pressing force of the pressure shaft 102 required for moving the first cam 61 in the first direction in the separating operation can be reduced.

According to the embodiment illustrated in FIGS. 10 and 12, the center of gravity G of the developing cartridge 1 and the shaft 63 are aligned in the second direction. In this case, the load to be imparted on the shaft 63 for moving the developing cartridge 1 in the second direction can be minimized. Accordingly, the pressing force of the pressure shaft 102 required for moving the first cam 61 in the first direction in the separating operation can be further reduced.

Incidentally, the position of the center of gravity G of the developing cartridge 1 is subject to change according to the consumption amount of the developing agent. Specifically, as the developing agent stored in the casing 10 decreases, the position of the center of gravity G of the developing cartridge 1 moves toward the developing roller 30. In this connection, the position of the center of gravity G of the developing cartridge 1 and the position of the shaft 63 may not be in line with each other in the second direction throughout an entire phase of the developing cartridge 1 from a non-used state to a used-up state. For example, the position of the center of gravity G of the developing cartridge 1 and the position of the shaft 63 may be in line with each other in the second direction in any one of the phases from the non-used state to the used-up state.

Incidentally, the holder 52 is movable in the second direction relative to the casing 10 and the holder cover 53. Hence, the electrical contact surfaces 511 can be kept in contact with the electrical contact of the main housing 101, regardless of whether the separating operation is performed or not.

5. Modifications

While the embodiment of the present disclosure has been described above, the present disclosure is not limited to the above-described embodiment.

In the above-described embodiment, the first cam 61 of the separation member 60 is held by the gear cover 41. However, the one end portion of the shaft 63 in the first direction may be held by the gear cover 41.

Further, in the above-described embodiment, the second cam 62 of the separation member 60 is held by the holder cover 53. However, the other end portion of the shaft 63 in the first direction may be held by the holder cover 53.

Further, in the above-described embodiment, the separation member 60 includes the first cam 61 and the second cam 62. However, the separation member 60 may not include the second cam 62. Further, in the above-described embodiment, the drum frame 90 includes the first bearing part 93 and the second bearing part 94. However, the drum frame 90 may not include the second bearing part 94.

Further, according the above-described embodiment, the first cam 61, the second cam 62, and the shaft 63 are integrally molded with resin. However, the first cam 61, the second cam 62, and the shaft 63 may be components independent of each other. Further, the shaft 63 may be made from metal such as iron.

According the above-described embodiment, the four developing cartridge 1 are attachable to the single drum cartridge 2. However, the number of the developing cartridges 1 attachable to the drum cartridge 2 may be one through three, or five or more.

Further, each component appearing in the embodiment and modifications may be suitably combined as long as no technical inconsistency arises.

What is claimed is:

1. A developing cartridge comprising:

a casing configured to store developing agent;

a developing roller rotatable about a first axis extending in a first direction and having a peripheral surface, a part of the peripheral surface on one side in a second direction being exposed to an outside of the casing and another part of the peripheral surface on an other side in the second direction being positioned inside the casing, the developing roller being positioned at one end portion of the casing in a third direction crossing both the first direction and the second direction;

a cam shaft extending along a second axis extending in the first direction, the cam shaft being movable in the first direction relative to both the casing and the developing roller; and a first cam positioned at one end portion of the cam shaft in the first direction and movable in the first direction together with the cam shaft, the first cam having a first inclined surface that is inclined to approach the developing roller in the second direction as extending toward the one end portion of the cam shaft from an other end portion of the cam shaft in the first direction, wherein a dimension of the casing in the third direction is smaller than a dimension of the casing in a fourth direction orthogonal to both the first direction and the third direction, and wherein the cam shaft and the first cam are positioned at an other end portion of the casing in the third direction.

2. The developing cartridge according to claim 1, further comprising an agitator rotatable about a third axis extending in the first direction, the agitator including an agitator shaft extending in the first direction, wherein the cam shaft and the first cam are positioned opposite the developing roller with respect to the agitator shaft in the third direction.

3. The developing cartridge according to claim 1, wherein the cam shaft is aligned with a center of gravity of the developing cartridge in the second direction in any one of phases from a non-used state of the developing cartridge to a used-up state of the developing cartridge.

4. The developing cartridge according to claim 1, wherein the casing has:

a first outer surface positioned on the same side as the developing roller in the third direction; and a second outer surface positioned on the same side as both the cam shaft and the first cam in the third direction.

5. The developing cartridge according to claim 4, wherein the first cam is positioned between the first outer surface and the second outer surface in the third direction.

6. The developing cartridge according to claim 4, wherein the first cam is positioned at the second outer surface.

7. The developing cartridge according to claim 6, wherein the second outer surface has a groove extending in the first direction, and wherein the cam shaft is positioned in the groove.

8. The developing cartridge according to claim 6, wherein the casing includes a rib protruding from the second outer surface, and wherein the cam shaft is positioned between the second outer surface and the rib in the second direction.

9. The developing cartridge according to claim 1, further comprising a resilient member configured to expand and compress in the first direction and positioned between the casing and the first cam in the first direction.

10. The developing cartridge according to claim 1, further comprising a gear cover positioned at one end portion of the casing in the first direction, wherein the first cam is held by the gear cover.

11. The developing cartridge according to claim 10, wherein the gear cover has a through-hole penetrating the gear cover in the first direction, and wherein the first cam is inserted in the through-hole.

12. The developing cartridge according to claim 1, further comprising a second cam positioned at the other end portion of the cam shaft in the first direction and movable in the first direction together with the cam shaft, the second cam having a second inclined surface that is inclined to approach the developing roller in the second direction as extending toward the one end portion of the cam shaft from the other end portion of the cam shaft in the first direction, wherein the second cam is positioned at the other end portion of the casing in the third direction.

13. The developing cartridge according to claim 12, further comprising a holder cover, the casing having one end portion and an other end portion in the first direction, the holder cover being positioned at the other end portion of the casing in the first direction, wherein the second cam is held by the holder cover.

14. The developing cartridge according to claim 13, wherein the holder cover has a through-hole penetrating the holder cover in the first direction, and wherein the second cam is inserted in the through-hole.

15. The developing cartridge according to claim 13, further comprising:

a storage medium having an electrical contact surface; and a holder holding the electrical contact surface and positioned between the casing and the holder cover in the first direction, wherein the cam shaft and the first cam are positioned opposite the developing roller with respect to the holder in the third direction.

16. The developing cartridge according to claim 1, wherein the casing has a toner filling port, and wherein the cam shaft and the first cam are positioned opposite the developing roller with respect to the toner filling port in the third direction.

17. The developing cartridge according to claim 1, wherein the cam shaft and the first cam are integrally molded with resin.

18. The developing cartridge according to claim 1, further comprising a storage medium having an electrical contact surface, wherein the third direction is a direction crossing the electrical contact surface.

* * * * *